United States Patent [19]

Westimayer et al.

[11] Patent Number: 4,928,793
[45] Date of Patent: May 29, 1990

[54] RIGID TREE SEAT

[76] Inventors: Anthony J. Westimayer, N6585 St. Helena Rd.; Gary Spettel, 118 South Palmatory St., both of Horicon, Wis. 53032

[21] Appl. No.: 356,940
[22] Filed: May 25, 1989
[51] Int. Cl.⁵ .................. A45F 3/26; A01M 31/02
[52] U.S. Cl. ............................ 182/187; 182/92; 108/152
[58] Field of Search ............ 182/92, 187, 188; 108/152

[56] References Cited
U.S. PATENT DOCUMENTS

| | | | |
|---|---|---|---|
| 2,943,669 | 7/1960 | Haam | 182/187 |
| 3,353,629 | 11/1967 | Brunes | 182/187 |
| 3,767,011 | 10/1973 | Witt | 182/187 |
| 4,113,058 | 9/1978 | Kobosh | 182/187 |
| 4,601,364 | 7/1986 | York | 182/187 |
| 4,625,833 | 12/1986 | Lewis | 182/187 |
| 4,674,597 | 6/1987 | Humphrey | 182/92 |
| 4,776,503 | 10/1988 | Sink | 182/187 |

Primary Examiner—Reinaldo P. Machado
Attorney, Agent, or Firm—Donald Cayen

[57] ABSTRACT

A rigid tree seat may be secured to a tree or worn as a backpack. The rigid tree seat comprises a sturdy frame having a seat portion and supporting ribs. The frame is removeably covered by a covering that, when in place, cooperates with the frame to form a pack for holding various supplies. First and second straps pass through the frame and the covering. The first strap is used to secure the rigid tree seat to a person's waist in backpack fashion or to a tree or the like. The second strap is used as a safety strap for a person sitting on the rigid tree seat in a tree.

21 Claims, 3 Drawing Sheets

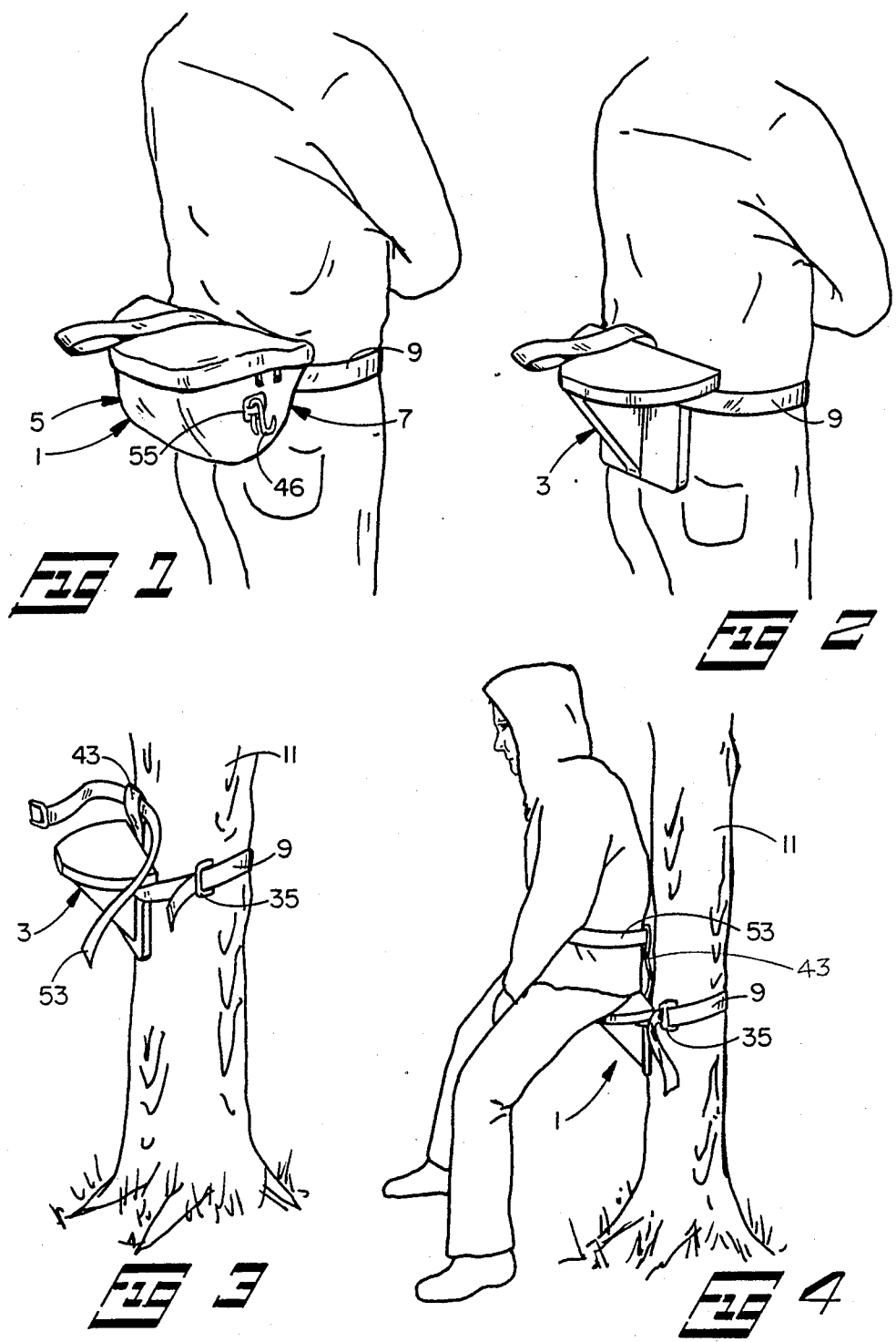

RIGID TREE SEAT

BACKGROUND OF THE INVENTION

1. Field of the Invention.

This invention pertains to sports equipment, and more particularly to apparatus useful for hiking and hunting.

2. Description of the Prior Art.

Various equipment has been developed that utilizes trees and posts as supports for sitting. Such tree seats are especially useful to hunters as they wait quietly watching for game. Many of the prior tree seats are more or less portable, and some are foldable to increase the convenience of carrying them.

However, the foldable feature of the prior tree seats also renders them undesirably heavy, expensive, noisy, and complicated. Further, several prior tree seats include sharp components that are intended to penetrate a tree. Such components can cause damage to the tree and injury to the user. For example, U.S. Pat. No. 2,711,783 shows a foldable portable seat that can be supported on the ground or on a tree trunk. The seat of the U.S. Pat. No. 2,711,783 patent has numerous parts that must be manipulated to open and close it, thereby rendering it rather awkward and noisy to set up and take down. One of the components is pointed for jamming into a tree trunk, which is a potential danger to both the tree and the user.

U.S. Pat. No. 2,991,842 describes a portable seat supportable on a tree trunk. The seat is made with a cutout having a long sharp edge for biting into a tree trunk. Although relatively simple in construction, the seat of the U.S. Pat. No. 2,991,842 patent requires care in handling it and in setting it up for proper functioning.

U.S. Pat. No. 4,113,058 discloses a rather complicated portable seat that has numerous moving parts. The seat is intended to be carried by suspending it from a person's belt, but the size and weight of the seat greatly diminish the advantage of the carryability feature.

U.S. Pat. No. 4,730,700 teaches a portable tree stand that can be worn as a backpack. The tree stand includes sharp points that penetrate a tree trunk in use, and that can be dangerous to the user.

U.S. Pat. No. 4,776,503 shows a combination backpack and seat accessory. A multi-piece frame includes rods with sharp ends. Sheathes may be placed over the sharp rods. The accessory can be converted between a seat mode and a backpack mode, but the sharp rods and numerous parts detract from its overall appeal.

Thus, a need exists for an improved hunting seat.

SUMMARY OF THE INVENTION

In accordance with the present invention, a simple and inexpensive rigid tree seat is provided that doubles as a backpack. This is accomplished by apparatus that includes only a single piece frame, a long strap, and a closeable covering.

The frame is constructed with a seat portion and first and second ribs for supporting the seat portion. The seat portion may be generally in the form of a semi-cylinder, with the ribs joined thereto generally along the seat portion axes. The seat portion is large enough to enable a person to sit comfortably on it but small enough to be carried comfortably around the person's waist.

To enable the rigid tree seat to be selectively carried in a convenient and unobtrusive manner or to be secured to a tree trunk, one of the frame ribs is formed with a slot that receives the strap. The strap is free to slide within the rib slot and along the ribs. The ends of the strap may be selectively secured around the person's waist or around a tree.

Further in accordance with the present invention, the frame is enclosable with and provides support for the covering. With the covering in place, the frame is converted into a small backpack or carrying pouch. The covering preferably has a zipper or other means for closing and opening it. The space inside the covering provides room for carrying supplies, food, and the like. The covering further includes a reinforcement patch having two slits for the passage of the strap. If desired, the covering may be removed from the frame both when the rigid tree seat is worn as a backpack and when it is secured to a tree for functioning as a seat.

It is a feature of the present invention that a second strap can be readily incorporated into it. The second strap preferably comprises a relatively short flexible strap having one end that is looped around or otherwise attached to the first strap, preferably near the slot in the frame first rib. The second strap passes through an opening in the other frame rib, such that the strap second end is free to be fastened to a person's safety belt. The second strap can thus be used as a safety line when the rigid tree seat is secured to a tree and a person is sitting on it. To accommodate the safety strap, the covering reinforcement patch has a third slit through which the safety strap passes.

Other advantages, benefits, and features of the invention will become apparent to those skilled in the art upon reading the detailed description of the invention.

BRIEF DESCRIPTION OF THE DRAWINGS

FIG. 1 is a perspective view of the rigid tree seat of the present invention shown being worn by a person as a backpack.

FIG. 2 is a view similar to FIG. 1, but showing the rigid tree seat with the covering removed.

FIG. 3 is a perspective view showing the rigid tree seat secured to a tree with the covering removed.

is a perspective view showing the rigid tree seat secured to a tree and a person sitting on it with the safety strap fastened to a person's waist.

Figure 5:
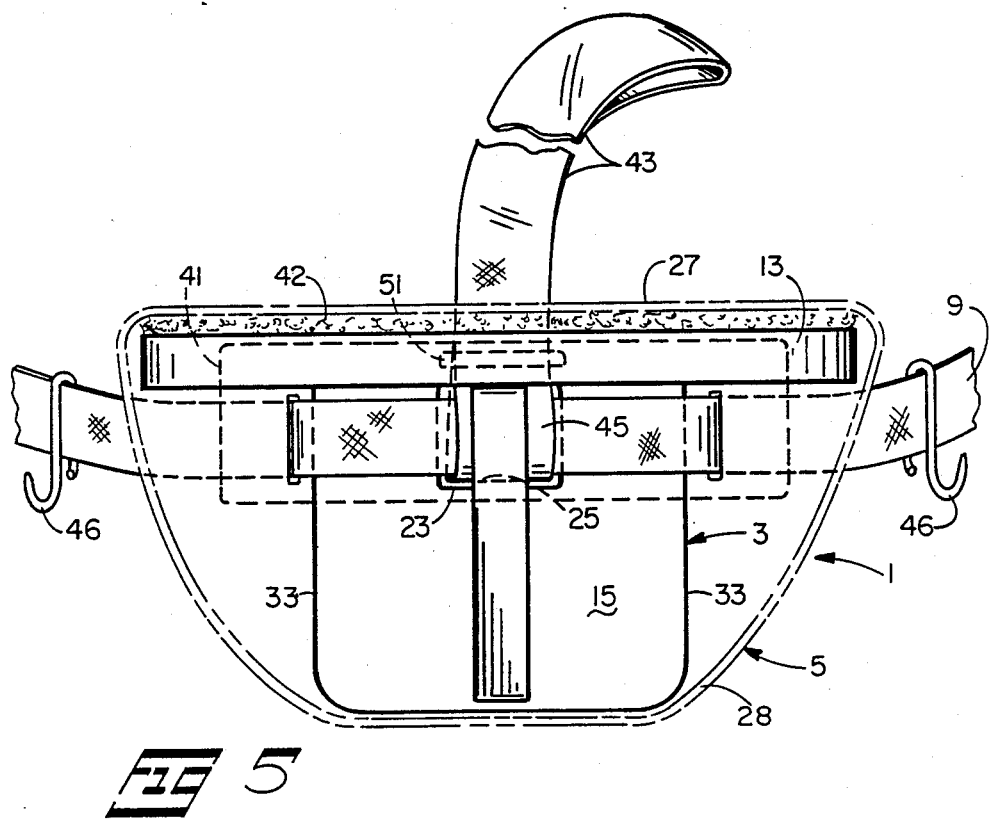

FIG. 5 is a front view, partially in phantom, of the present invention.

Figure 6:
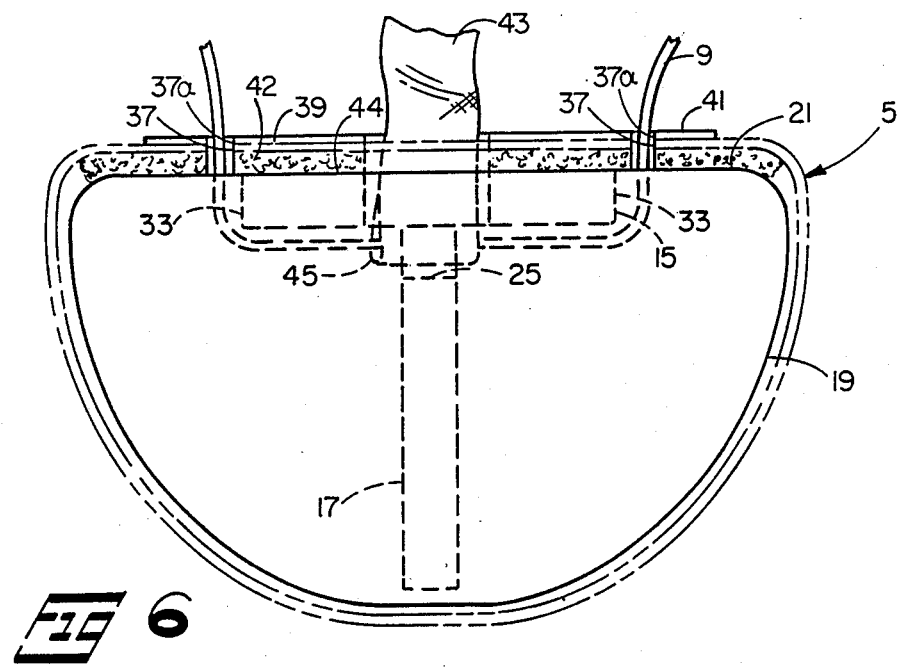

FIG. 6 is a top view, partially in phantom, of the present invention.

Figure 7:
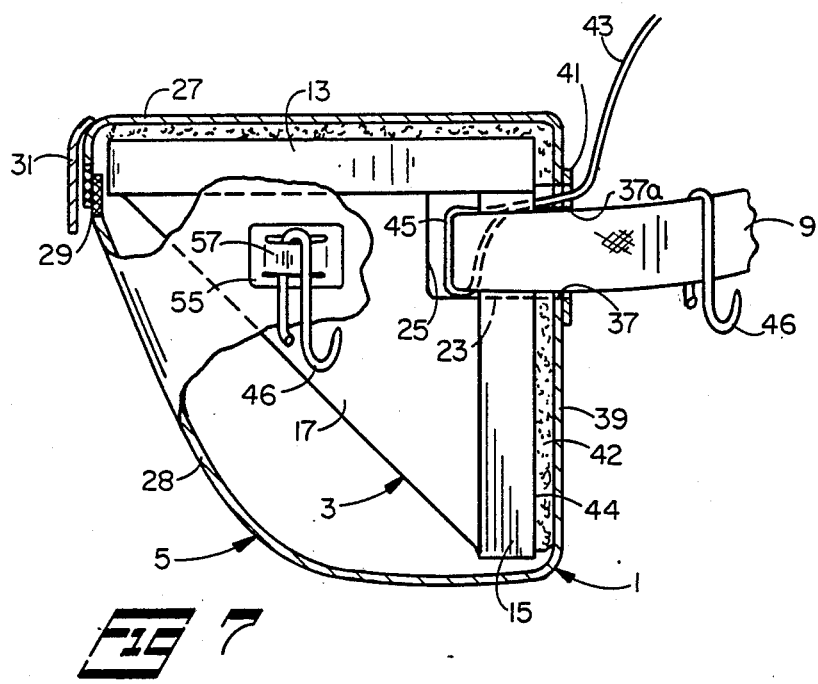

FIG. 7 is a side view, partially in section, of the rigid tree seat of the present invention.

Figure 8:
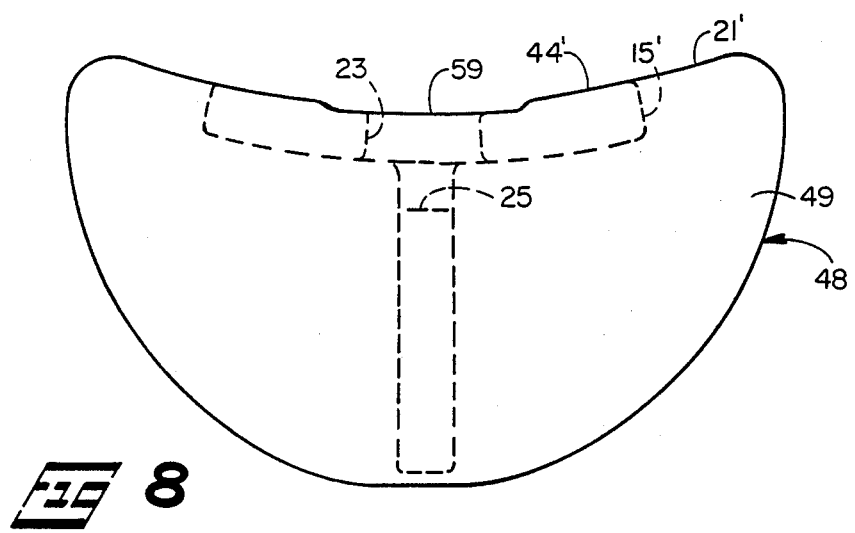

FIG. 8 is a top view of an alternate embodiment of the frame of the present invention.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1-7, a rigid tree seat 1 is illustrated that includes the present invention. The rigid tree seat is particulary useful to hunters and hikers for carrying supplies and for providing a resting place, but it will be understood that the invention is not limited to outdoor use.

The rigid tree seat 1 is comprised of a rigid frame 3 that is removeably covered by a covering 5. A long flexible strap 9 passes through the frame 3 and covering 5. The free ends of the strap 9 may be secured around a person's waist, such that the rigid tree seat is usable as a small and comfortable backpack, FIG. 1. In FIG. 2, the frame 3 is shown worn around the person's waist by means of the strap 9 and with the covering removed. In FIG. 3, the rigid tree seat is secured, with the covering removed, to a tree 11 or similar vertical support.

Looking especially at FIGS. 5–7, the rigid tree seat frame 3 is constructed with a seat portion 13 and two supporting ribs 15 and 17. The seat portion 13 is generally semi-cylindrical in shape, having a generally semi-circular outer edge 19 and a generally diametrical edge 21.

Depending from and joined to the frame seat portion 13 along the diametrical edge 21 is the first rib 15. The second rib 17 also depends from the seat portion. Preferably, the seat portion 13 and the two ribs 15 and 17 are mutually perpendicular. The first rib has an opening 23 therethrough near the junction of the seat portion and the second rib, and the second rib has a slot 25 through it in general alignment with the first rib opening 23. Although the frame may be made from any suitable material, such as wood, we prefer a molded thermosetting plastic material.

The covering 5 is suitably cut and sewn to fit neatly over the frame 3. The covering 5 is constructed with a pouch portion 28 that surrounds the ribs 15 and 17 and a cover 27 that overlies the seat portion 13. The cover 27 is releaseably fastened to the pouch portion 28 by a zipper 29. A quiet type zipper is preferred. A flap 31 of material sewn to the cover 27 overlies the zipper 29. When in place on the frame, the space created between the covering pouch portion and the frame ribs and seat portion is useful for storing ammunition, cameras, food, and other supplies.

The covering 5 is made of a heavy canvass or duck material. The material may be of any suitable color or design, such as blaze orange, camouflage, or bark camouflage. A person may use different colored coverings interchangeably with a frame 3, depending on the type of hunting or other activity he will pursue while using the rigid tree seat 1.

The strap 9 enables the frame 3, either with or without the covering 5 in place thereover, to be worn around a person's waist or secured to a tree trunk 11, FIGS. 1–3. The strap 9 passes loosely through the frame slot 25 and around the outer edges 33 of the rib 15. The ends of the strap are provided with buckles 35 for securing the strap free ends to the person's waist or the tree.

With the covering 5 in place, the strap 9 passes through slits 37 in a back panel 39 in the covering. To provide maximum strength and durability to the covering, a patch 41 having slits 37a that align with the covering slits 37 is sewn to the covering panel 39. The strap 9 also passes through the patch slits 37a. The patch 41 is made from a durable leather or similar abrasion resistant but flexible material. Because the strap is free to slide within the slits 37, 37a and the frame slot 25, the rigid tree seat is very versatile and easy to use both when securing it to a person's waist as a backpack 7 and when securing it to a tree 11 or similar upright support. However, for some applications, the strap may be fixed to the frame, if desired. For increased comfort, padding 42 can be bonded to either the top surface of the seat portion 13 or to the outside surface 44 of the rib 15 or to both of those surfaces.

Further in accordance with the present invention, the rigid tree seat 1 includes a short strap 43. The short strap 43 is approximately 12 inches long and has a loop 45 on both ends. One of the loops 45 receives the strap 9 therethrough in the vicinity of the frame opening 23 and slot 25. The strap 43 passes through the frame opening 23 and through the back panel 39 of the covering 5. Passage through the covering back panel is by means of aligned slits 51 in the covering back panel and in the reinforcement patch 41. The loop on the second end of the safety strap is designed to be fastened to the person's safety belt 53 behind his back when he sits on the rigid tree seat, FIG. 4. In that manner, the strap 43 acts as a safety strap, connecting the strap 9 to the person's safety belt 53 worn around his waist.

The design of the rigid tree seat 1 is such that the covering 5 and straps 9 and 43 are very quickly and easily removeable from the frame 3. Removal is achieved merely by unzipping the zipper 29 and pulling one end of the strap 9 through the associated slits 37 and 37a in the covering back panel 39 and patch 41, respectively, and through the frame slot 25. The safety strap 43 is pulled through the slits 51 in the reinforcement patch and covering back panel and through the frame opening 23. Then the frame can be pulled from inside the covering pouch portion 28 without difficulty. Conversely, the covering and straps can be assembled over the frame merely by placing the frame inside the covering, pushing the appropriate end of the strap 9 through the frame slot 25 and through the appropriate slits 37 and 37a, and the safety strap through the slits 51. The cover 27 can then be zipped to the pouch portion 28. To provide even greater versatility and usefulness for the rigid tree seat, one or more slotted J-shaped hooks 46 can be suspended from the strap 9 for hanging various accessories such as binoculars and cameras. Alternately, patches 55 may be sewn to one or both ends of the covering. The patches 55 are cut to form loops 57 for supporting the hooks 46.

Turning to FIG. 8, a modified frame 48 is illustrated. The modified frame 48 has a seat portion 49 with a concave diametrical edge 21'. The outside surface 44' of the first rib 15' is also concave, rather than straight, so as to be coplanar with the seat portion concave edge 21'. A continuous relatively wide and shallow groove 59 may be formed in the first rib outside surface 44' and in the seat portion edge 21. In all other respects, including the provision for padding, the frame 48 is identical to the frame 3 described in connection with FIGS. 1–7. The major advantage of the modified frame 48, especially with the groove 59, is that it is more stable when secured to tree trunks and to persons' waists than the straight sided frame 3. Although not shown, it will be appreciated that a groove similar to groove 59 may be formed in the first rib outside surface 44 and the seat portion diametral edge 21 of the frame 3 of FIGS. 1–7.

Thus, it is apparent that there has been provided, in accordance with the invention, a rigid tree seat that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A rigid tree seat comprising:
 a. a frame comprising:
  i. a seat portion; and
  ii. rib means depending from the seat portion and joined thereto;
 b. covering means for removeably covering the frame; and
 c. strap means passing through the frame and covering means for releaseably securing the frame to a selected support.

2. The rigid tree seat of claim 1 wherein the rib means comprises first and second mutually perpendicular ribs rigidly joined to each other.

3. The rigid tree seat of claim 1 wherein:
 a. the seat portion is generally semi-cylindrical in shape with a diametrical edge; and
 b. the rib means comprises:
  i. a first rib depending from and joined to the seat portion and having an outside surface lying in a plane generally coplanar with the seat portion diametrical edge; and
  ii. a second rib depending from and joined to the seat portion and perpendicular to the first rib.

4. The rigid tree seat of claim 3 wherein the seat portion diametrical edge is concave, and wherein the second rib outside surface is curved so as to be generally coplanar with the concave seat portion diametrical edge.

5. The rigid tree seat of claim 3 wherein:
 a. the second rib has a slot therethrough; and
 b. the strap means comprises a long flexible strap that passes loosely through the frame slot to thereby facilitate securing the frame to the selected support.

6. The rigid tree seat of claim 5 wherein the covering means has first and second reinforced slits therethrough to enable the strap to loosely pass through the covering means.

7. The rigid tree seat of claim 1 further comprising safety means attached to the strap means for releaseably fastening to a selected object.

8. The rigid tree seat of claim 3 wherein:
 a. the first rib has an opening therethrough;
 b. a safety strap is attached to the strap means proximate the first and second ribs and passes through the first rib opening.

9. The rigid tree seat of claim 6 wherein:
 a. the first rib has an opening therethrough;
 b. the covering means has a third reinforced slit therethrough; and
 c. a safety strap having two ends is attached at one end thereof to the strap proximate the first rib opening and extends therethrough and through the third reinforced slit in the covering means, the safety strap second end being selectively fastenable to a selected object to retain the rigid tree seat thereto.

10. Apparatus for being selectively secured to a person or to a vertical support comprising:
 a. a frame comprising a seat portion having an outside surface and a first edge and at least one rib joined to and depending from the seat portion along the first edge thereof, the first rib having inside and outside surfaces, the first rib outside surface being generally coplanar with the seat portion first edge;
 b. covering means for removeably covering the frame, the covering means and frame cooperating to define an inner space therebetween; and
 c. a long flexible strap passing adjacent the frame rib inside surface and through the covering means and having ends for selectively securing the frame to the person or to the vertical support.

11. The apparatus of claim 10 wherein:
 a. the frame further comprises at least one second rib joined to the first rib and to the seat portion; and
 b. the frame second rib has a slot therethrough for loosely receiving the long strap,
 so that the strap may be slid within the frame and covering means to facilitate securing the apparatus to the person or to the vertical support.

12. The apparatus of claim 10 wherein the outside surface of the frame seat portion is covered with a soft padding to thereby render the frame comfortable to a person sitting on the seat portion.

13. The apparatus of claim 10 further comprising a short strap having a first end attached to the long flexible strap proximate the first rib and passing through the covering means, the short strap having a second end selectively fastenable to a person,
 so that the short strap acts as a safety strap when the apparatus is secured to a vertical support by the long strap and the person sits on the seat portion.

14. The apparatus of claim 13 wherein the covering means comprises reinforced slits through which the long flexible strap and safety strap pass for selectively securing the frame to a vertical support or to a person and for selectively fastening to a person, respectively.

15. The apparatus of claim 10 wherein:
 a. the first rib has an opening therethrough; and
 b. a safety strap having two ends is attached at one end thereof to the long flexible strap and passes through the first rib opening and through the covering means,
 so that the safety strap second end can be fastened to a person when the apparatus is secured to a vertical support by the long flexible strap and a person sits on the seat portion.

16. The apparatus of claim 10 wherein:
 a. the seat portion first edge is concave; and
 b. the first rib outside surface is generally concave and coplanar with the seat portion first edge.

17. The apparatus of claim 16 wherein the seat portion first edge and the first rib outside surface define a groove therein for imparting increased stability to the frame when it is secured to the person or to a generally cylindrical vertical support.

18. An article of manufacture useful as a frame for a rigid tree seat comprising:
 a. a seat portion having a first edge;
 b. a first rib joined to and depending from the seat portion, the first rib having an outside surface that is generally coplanar with the seat portion first edge, wherein the first rib defines an opening therethrough proximate the seat portion; and
 c. at least one second rib joined to the seat portion and the first rib, the second rib defining a slot therethrough.

19. The article of manufacture of claim 18 wherein:
 a. the slot in the second rib is located proximate the intersection of the seat portion and the first rib; and
 b. the opening in the first rib is located proximate the slot in the second rib.

20. An article of manufacture useful as a frame for a rigid tree seat comprising:
   a. a seat portion having a first edge;
   b. a first rib joined to and depending from the seat portion, the first rib having an outside surface that is generally coplanar with the seat portion first edge, wherein the seat portion first edge and the first rib outside surface define a common groove therein; and
   c. at least one second rib joined to the seat portion and the first rib, the second rib defining a slot therethrough.

21. An article of manufacture useful as a frame for a rigid tree seat comprising:
   a. a seat portion having a concave first edge;
   b. a first rib joined to and depending from the seat portion, the first rib having a concave outside surface that is generally coplanar with the seat portion first edge, wherein the seat portion first edge and the first rib outside surface define a relatively wide and shallow groove therein; and
   c. at least one second rib joined to the seat portion and the first rib, the second rib defining a slot therethrough, so that the frame seat portion first edge and the first rib outside surface generally conform to the contour of a round vertical support and to a person's waist.

* * * * *